M. HAMBURGER.
CLEAR VISION AND GLAROSCOPE ATTACHMENT FOR WIND SHIELDS.
APPLICATION FILED NOV. 7, 1916.
1,304,766.
Patented May 27, 1919.
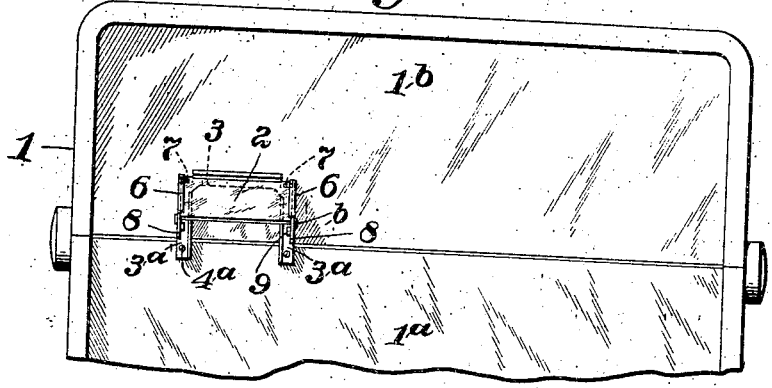
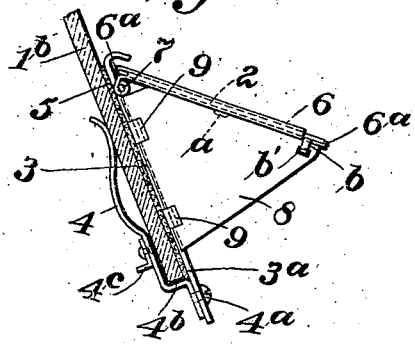
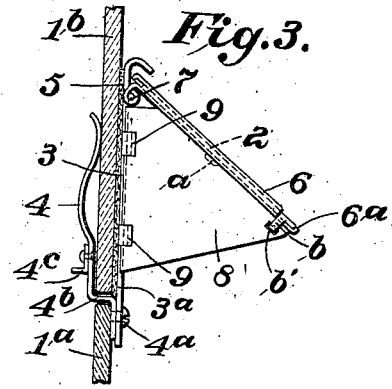
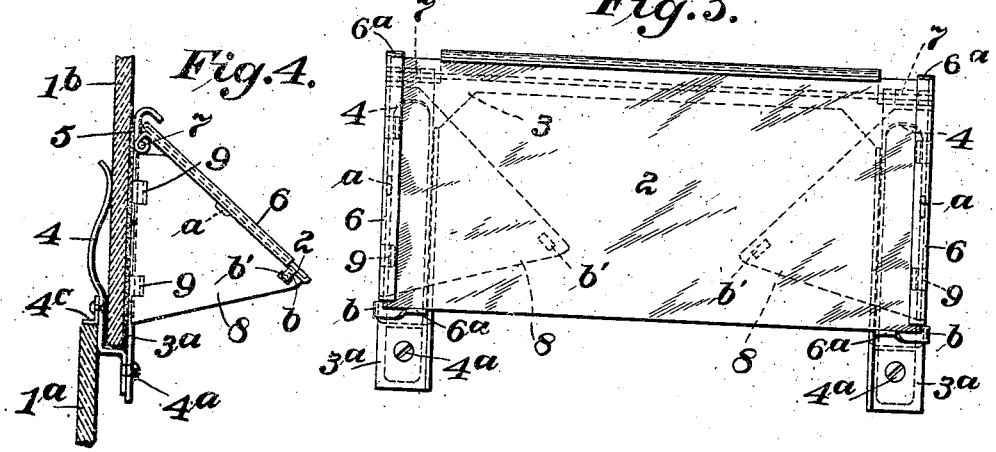
Inventor:
Mark Hamburger,
by Spear Middleton Donaldson & Spear
Attys.

UNITED STATES PATENT OFFICE.

MARK HAMBURGER, OF BALTIMORE, MARYLAND.

CLEAR-VISION AND GLAROSCOPE ATTACHMENT FOR WIND-SHIELDS.

1,304,766.    Specification of Letters Patent.    Patented May 27, 1919.

Application filed November 7, 1918. Serial No. 261,524.

*To all whom it may concern:*

Be it known that I, MARK HAMBURGER, a citizen of the United States, and resident of Baltimore, Maryland, have invented certain new and useful Improvements in Clear-Vision and Glaroscope Attachments for Wind-Shields, of which the following is a specification.

My present invention relates to improvements in attachments for wind-shields of motor vehicles.

In devising my present invention I have aimed to provide a simple and economical device which may be readily applied to the ordinary wind-shield to exclude the rain from the portion in front of the driver and enable him to have a clear vision in rainy weather.

I have also aimed to provide a device which will serve to soften the action of the sunlight on the eyes in driving in bright sunny weather, and which may be used as a glare preventive at night.

A further object is to provide an attachment of such form that it may be folded or assembled in compact space for shipping, thus enabling it to be handled conveniently as a mail order article.

With these and other objects in view the invention includes the novel features of construction and arrangement and combination of parts hereinafter described, my invention being defined by the appended claims.

An embodiment of said invention is illustrated in the accompanying drawings in which, Figure 1 is a front elevation.

Fig. 2 is a side elevation showing the upper wind shield swung outwardly and the attachment in place.

Fig. 3 is a similar view with the upper wind shield pane swung back into vertical position.

Fig. 4 shows the attachment applied to a wind shield with overlapping panes or sections.

Fig. 5 is a front view of the folded attachment ready for packing.

Referring by reference characters to this drawing the numeral 1 designates an ordinary clear vision wind-shield having a lower glass 1$^a$ and upper glass 1$^b$. 2 designates a glass pane designed to be applied to the wind shield directly in front of the driver and to normally incline forwardly in such position as to give the driver a clear vision beneath the lower edge of the glass pane while at the same time the latter serves as a shield to prevent the rain or snow from driving against and collecting on the wind-shield pane 1$^b$.

To support the protecting pane 2 from the wind-shield I provide a metal frame 3 preferably stamped from sheet metal and of substantially inverted U-shape in form, the depending legs 3$^a$ of which frame are provided with spring clamps 4 designed to engage the back side of the wind-shield pane 1$^b$. These clamps are simply spring arms having their lower ends riveted to the depending legs 3$^a$, as indicated at 4$^a$ and having angular bends 4$^b$ designed to abut against the lower edge of the pane 1$^b$ to limit the upward movement. The arms are curved outwardly or backwardly at their upper ends, so that by swinging the upper wind shield outwardly, as in Fig. 2 the attachment may be readily slipped into place. On again swinging the upper pane back into alinement with the lower pane, as in Fig. 3, the angular bends or shoulders 4$^b$ will rest on the upper edge of the lower pane and thus hold the attachment in position.

In some classes of wind shields the upper wind shield pane overlaps the lower pane and to hold the attachment in position in such cases I provide the arms 4 with lugs 4$^c$ for resting upon the upper edge of the lower pane, when the upper pane is in overlapping position.

The portion or face of the frame 3 which lies against the wind shield glass is preferably provided with a facing 5 of felt or other soft material to prevent scratching the glass and assisting in holding the device against slipping laterally and also to make a weather proof joint. The glass pane 2 is held at its side members by the parallel side members 6 provided with overturned edges forming grooves or channels into which the glass is slipped, and provided with lugs 6$^a$ serving as stops for the glass. The side members 6 are connected by offset hinges 7 to the upper corners of the frame 3 so that the glass 2 may be folded flat against the frame 3 for convenience in packing and also to bring the protecting pane 2 flat against the pane 1$^b$ to protect the eyes from the glare of head lights at night or against the direct rays of the sun when driving toward it when it is low in the sky.

The protecting pane is normally held in its outwardly inclined position by side plates 8 which are connected to the side edges of the frame 3 by suitable hinges 9 of a character designed to permit the plates to fold either inwardly or outwardly.

The side members 6 are provided with downwardly struck or depending lugs or projections $a$ against which the inner faces of the edges of the side plates abut, and said side plates are locked or retained in this position by spring tongues $b$ carried near the outer ends of the arms 6 which overlie the outer faces of the side plates and have inwardly turned portions entering recesses or openings $b^1$ in the side plates, whereby the arms 6 and glass pane carried thereby are locked in the inclined position.

It will thus be seen that the side plates may be swung inwardly against the frame 3 and the arms 6 and pane carried thereby folded down flat upon the side plates, producing a flat compact package for shipping and conversely, when the device is in place upon a wind-shield the side plates may be swung outwardly and the arms 6 and glass folded down against the wind-shield to enable the colored glass to protect the eyes of the driver from the glare of headlights. The side plates serve also to prevent rain and snow from driving in behind the protecting pane at the sides.

The horizontal portion of the frame 3 is provided with an overturned edge or portion which overhangs the upper edge of the glass and prevents rain from driving in at the joint at the upper edge thereof.

It will be understood that while I have referred to my invention as designed more specifically for attachments to the windshields of motor vehicles it is, of course, not limited to this particular use but is applicable to the windowpane of any moving vehicle, such, for example, as street and pullman cars and locomotives.

What I claim is:

1. An attachment for wind-shields comprising a supporting frame, means for clamping the same against the wind-shield pane, a protecting pane having a hinged connection with said supporting frame, side plates hinged to said frame, and means for detachably connecting said side plates with said protecting pane.

2. In combination a supporting frame, means for detachably securing the same to a wind shield, a pair of arms hinged thereto, a sheet of transparent material carried by said arms, a pair of triangular plates hinged to the sides of said main frame, stops carried by the arms for contacting with the inner faces of said plates and spring catches carried by said arms for engaging the outer faces of the side plates and locking the arms thereto.

3. In combination a supporting frame, with means for clamping the same against a wind shield pane, a supplemental pane hinged thereto at the upper edge, means for holding said supplemental pane at an angle to the supporting frame, said supporting frame having a part overhanging the upper edge of the supplemental pane.

In testimony whereof I affix my signature.

MARK HAMBURGER.